(12) United States Patent
Tanimori et al.

(10) Patent No.: US 11,906,963 B2
(45) Date of Patent: *Feb. 20, 2024

(54) VEHICLE DISPLAY DEVICE, VEHICLE CONTROL SYSTEM, VEHICLE CONTROL METHOD, AND STORAGE MEDIUM

(71) Applicant: TOYOTA JIDOSHA KABUSHIKI KAISHA, Toyota (JP)

(72) Inventors: Shunsuke Tanimori, Susono (JP); Toshiki Kindo, Yokohama (JP); Yuji Suzuki, Toyota (JP); Mutsumi Matsuura, Okazaki (JP); Tomoaki Miyazawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

This patent is subject to a terminal disclaimer.

(21) Appl. No.: 17/674,946

(22) Filed: Feb. 18, 2022

(65) Prior Publication Data

US 2022/0174243 A1    Jun. 2, 2022

Related U.S. Application Data

(63) Continuation of application No. 16/914,631, filed on Jun. 29, 2020, now Pat. No. 11,290,691.

(30) Foreign Application Priority Data

Jul. 30, 2019 (JP) .................. 2019-140116

(51) Int. Cl.
*G05D 1/00* (2006.01)
*H04N 7/18* (2006.01)
(Continued)

(52) U.S. Cl.
CPC .......... *G05D 1/0038* (2013.01); *B60K 35/00* (2013.01); *B60Q 1/507* (2022.05); *B60Q 1/543* (2022.05);
(Continued)

(58) Field of Classification Search
CPC . H04N 7/183; G05D 1/0016; B60K 2370/797
See application file for complete search history.

(56) References Cited

U.S. PATENT DOCUMENTS

2016/0023665 A1    1/2016 Sherony et al.
2017/0255195 A1*   9/2017 Mabuchi .............. G05D 1/0022
(Continued)

FOREIGN PATENT DOCUMENTS

CN    110505983 A  * 11/2019 ............. B60Q 1/503
CN    110505983 A    11/2019
(Continued)

OTHER PUBLICATIONS

Jun. 10, 2021 Office Action issued in U.S. Appl. No. 16/914,631.
(Continued)

*Primary Examiner* — Jeremiah C Hallenbeck-Huber
(74) *Attorney, Agent, or Firm* — Oliff PLC

(57) ABSTRACT

A vehicle display device is provided, the vehicle display device including a communication section configured to receive an image of a remote driver remotely operating a vehicle, an external vehicle display section configured to display an image externally to the vehicle, and a display control section configured to cause the image of the remote driver received by the communication section to be displayed on the external vehicle display section.

18 Claims, 4 Drawing Sheets

(51) Int. Cl.
*H04N 5/64* (2006.01)
*H04L 67/125* (2022.01)
*B60K 35/00* (2006.01)
*B60W 60/00* (2020.01)
*B60Q 1/50* (2006.01)
*H04L 67/01* (2022.01)

(52) U.S. Cl.
CPC ......... *B60W 60/005* (2020.02); *G05D 1/0016* (2013.01); *H04L 67/125* (2013.01); *H04N 5/64* (2013.01); *H04N 7/183* (2013.01); *B60K 2370/797* (2019.05); *H04L 67/01* (2022.05)

(56) References Cited

U.S. PATENT DOCUMENTS

| 2019/0179147 | A1* | 6/2019 | Ichimura | G06F 3/167 |
| 2019/0212732 | A1  | 7/2019 | Takanashi et al. | |
| 2019/0286144 | A1* | 9/2019 | Yasuda | G05D 1/021 |
| 2019/0355019 | A1* | 11/2019 | Takanashi | G06Q 30/0266 |
| 2020/0159251 | A1* | 5/2020 | Iwasaki | B60R 16/037 |

FOREIGN PATENT DOCUMENTS

| JP | 2016-029566 A | 3/2016 |
| JP | 2018-077649 A | 5/2018 |

OTHER PUBLICATIONS

Nov. 18, 2021 Notice of Allowance issued in U.S. Appl. No. 16/914,631.

Mar. 18, 2021 Office Action issued in U.S. Appl. No. 16/914,631.

\* cited by examiner

VEHICLE DISPLAY DEVICE, VEHICLE CONTROL SYSTEM, VEHICLE CONTROL METHOD, AND STORAGE MEDIUM

CROSS-REFERENCE TO RELATED APPLICATION

This application is a Continuation of application Ser. No. 16/914,631, filed Jun. 29, 2020, which claims priority to Japanese Application No. 2019-140116, filed Jul. 30, 2019. The entire contents of the prior applications are hereby incorporated by reference herein in their entirety.

BACKGROUND

Technical Field

The present disclosure relates to a vehicle display device, a vehicle control system, a vehicle control method, and a storage medium.

Related Art

Remote driving in which a vehicle is operated by a remote driver at another location is sometimes utilized in order to supplement self-driving in which the vehicle drives autonomously. An occupant in a vehicle that is being remotely driven essentially does not handle the vehicle, and travel, turning, acceleration, deceleration, and stopping of the vehicle are entrusted to the remote driver.

In cases in which remote driving is entrusted to a remote driver, an occupant may feel uneasy if they are unable to observe how remote driving is being performed. Moreover, if the actions of the remote driver are performed in an isolated environment, the remote driver might develop a diminished sense of responsibility.

Japanese Patent Application Laid-Open (JP-A) No. 2018-077649 discloses a remote driving control device in which a scene of a remote driver performing a driving operation is made available to an occupant by being displayed on a display device within a vehicle cabin.

However, in the technology disclosed in JP-A No. 2018-077649, since the scene including the remote driver is only made available to the occupant, in cases in which there is no occupant present or in cases in which the occupant is sleeping, no one is present to monitor the actions of the remote driver. The remote driver might develop a diminished sense of responsibility as a result.

SUMMARY

In consideration of the above circumstances, the present disclosure provides a vehicle display device, a vehicle control system, a vehicle control method, and a storage medium that make the actions of a remote driver available to a third person other than an occupant.

A first aspect of the present disclosure is a vehicle display device including a communication section configured to receive an image of a remote driver remotely operating a vehicle, an external vehicle display section provided to an outer shell of the vehicle and configured to display an image externally to the vehicle, and a display control section configured to cause the image of the remote driver received by the communication section to be displayed on the external vehicle display section.

The vehicle display device of the first aspect enables the actions of the remote driver performing remote driving to be made available to a third person other than an occupant.

The first aspect may be configured such that the image of the remote driver is acquired by an image-capture section provided to a remote operation terminal configured to remotely operate the vehicle.

This configuration enables the image of the remote driver who is remotely operating the vehicle to be displayed on the external vehicle display section.

The first aspect may be configured such that the external vehicle display section is installed to a surface of a door panel of the vehicle.

This configuration enables the actions of the remote driver performing remote driving to be displayed on the door panel of the vehicle.

The first aspect may be configured such that the external vehicle display section is installed to either a windshield or a side window of the vehicle.

This configuration enables the actions of the remote driver performing remote driving to be displayed on a window of the vehicle.

A second aspect of the present disclosure is a vehicle control system including a vehicle provided with the vehicle display device of the first aspect, a first terminal configured to be used by a user, a second terminal that includes an image-capture section and is configured to be used by a remote driver to remotely operate the vehicle, and a server that is connected to the first terminal and the second terminal so as to be capable of communication with the first terminal and the second terminal. The server is configured to receive a remote driving request for the vehicle from the first terminal, transmit the remote driving request to the second terminal, confer driving authority on the second terminal, and enable communication between the second terminal and the vehicle. The second terminal is configured to, after receiving the remote driving request and being conferred with driving authority from the server, image the remote driver using the image-capture section and transmit a captured image to the vehicle display device of the vehicle.

A third aspect of the present disclosure is a vehicle control method including receiving a remote driving request for a vehicle from a first terminal used by a user, transmitting the remote driving request to a second terminal configured to perform remote operation of the vehicle by a remote driver, conferring driving authority on the second terminal, and enabling communication between the second terminal and the vehicle, imaging the remote driver using an image-capture section of the second terminal, and transmitting a captured image to the vehicle, and causing a vehicle display device of the vehicle to display the received captured image on an external vehicle display section provided to an outer shell of the vehicle and configured to display an image externally to the vehicle.

A fourth aspect of the present disclosure is a non-transitory storage medium storing a program that causes a computer to execute vehicle control processing, the vehicle control processing including receiving a remote driving request for a vehicle from a first terminal used by a user, transmitting the remote driving request to a second terminal configured to perform remote operation of the vehicle by a remote driver, conferring driving authority on the second terminal, and enabling communication between the second terminal and the vehicle, imaging the remote driver using an image-capture section of the second terminal, and transmitting a captured image to the vehicle, and causing a vehicle display device of the vehicle to display the received captured image on an external vehicle display section provided to an outer shell of the vehicle and configured to display an image externally to the vehicle.

As explained above, the vehicle display device according to the above aspect makes the actions of the remote driver performing remote driving available to a third person other than the occupant. This may encourage a sense of responsibility on the part of the remote driver, and contribute to safe driving during remote driving.

BRIEF DESCRIPTION OF THE DRAWINGS

An exemplary embodiment of the present disclosure will be described in detail based on the following figures, wherein.

DETAILED DESCRIPTION

Figure 1:
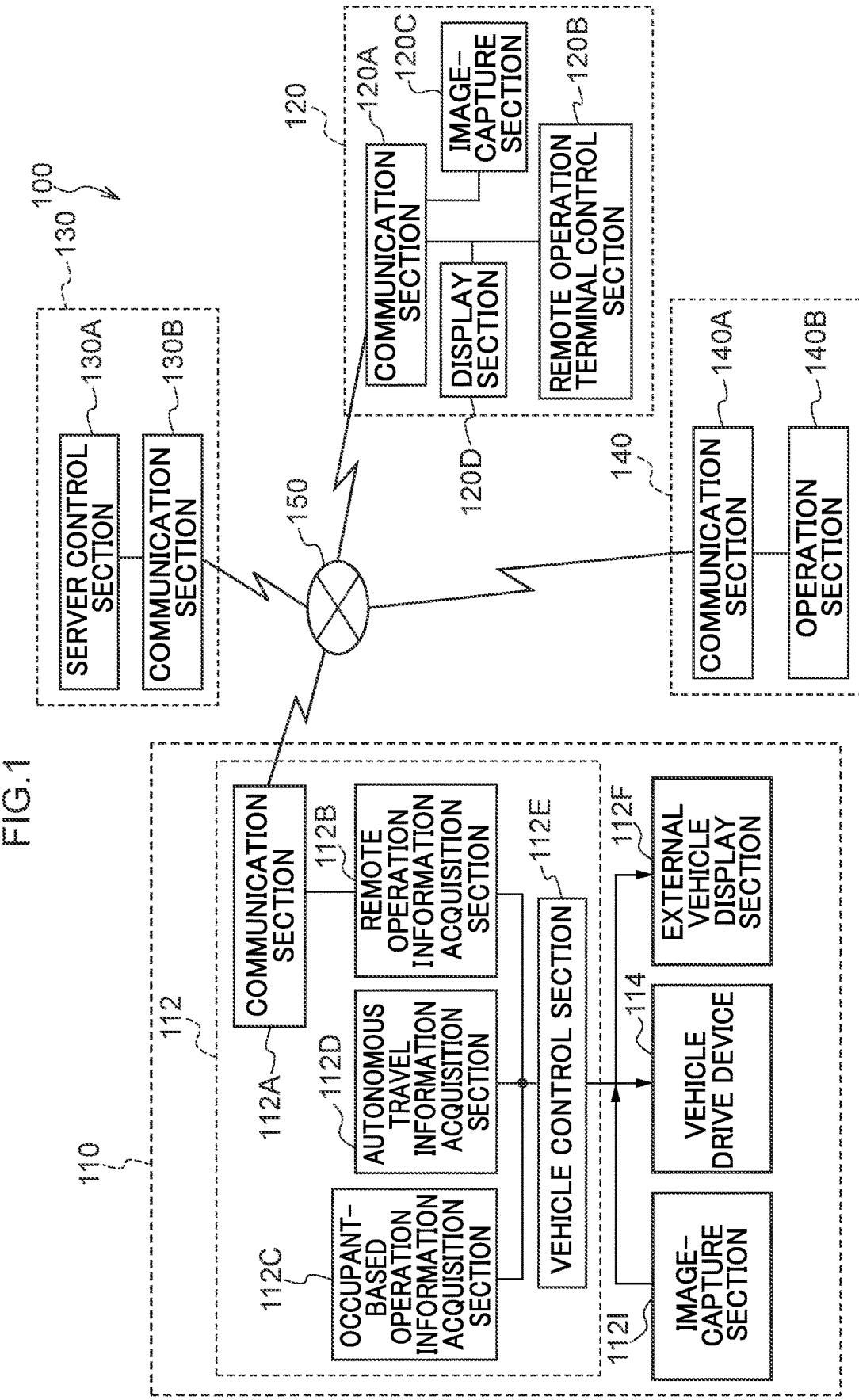
FIG. 1 is a block diagram illustrating a specific example of configuration of a vehicle control system including a vehicle display device according to an exemplary embodiment of the present disclosure.

Explanation follows regarding a vehicle display device according to an exemplary embodiment, with reference to FIG. 1. FIG. 1 is a block diagram illustrating a specific example of configuration of a vehicle control system 100 including the vehicle display device according to an exemplary embodiment of the present disclosure.

As illustrated in FIG. 1, the vehicle control system 100 of the exemplary embodiment includes a vehicle 110, a remote operation terminal 120, a server 130, and a user terminal 140. The vehicle 110, the remote operation terminal 120, the server 130, and the user terminal 140 are connected together through a network 150. As an example, the network 150 is a wired or wireless communication network employing public lines, such as the internet.

The vehicle 110 includes an electronic control unit (ECU) 112 that controls vehicle travel, a vehicle drive device 114 that drives the vehicle in response to control signals from the ECU 112, an external vehicle display section 112F that displays an image of a remote driver performing remote driving on the exterior of the vehicle, as described later, and an image-capture section 112I that acquires image data of the surroundings of the vehicle 110 for remote driving.

The ECU 112 includes a processor such as a CPU, and a storage device (memory). As illustrated in FIG. 1, functionality of the ECU 112 includes a communication section 112A, a remote operation information acquisition section 112B, an occupant-based operation information acquisition section 112C, an autonomous travel information acquisition section 112D, and a vehicle control section 112E.

The communication section 112A exchanges information with other devices. The communication section 112A is a communication unit that is capable of performing wireless communication through the network 150 employing what is referred to as V2X (vehicle-to-everything communication, encompassing vehicle-to-vehicle communication and road-to-vehicle communication).

The remote operation information acquisition section 112B acquires operation information transmitted from the remote operation terminal 120. The operation information transmitted from the remote operation terminal 120 is operation information input to the remote operation terminal 120 by a remote driver.

The occupant-based operation information acquisition section 112C acquires operation information input by an occupant on board the vehicle. The information input by the occupant includes the steering angle, throttle amount, brake pedal depression strength, and the position of a shift lever.

The autonomous travel information acquisition section 112D acquires information relating to autonomous travel. Examples of information relating to autonomous travel include control signals from other ECUs, position information of the vehicle 110 acquired by a global positioning system (GPS) or the like, and sensor signals from various sensors (such as an image-capture device and a laser radar sensor) installed in the vehicle 110. The position information of the vehicle 110 acquired by the GPS and so on is transmitted to the server 130 and the remote operation terminal 120, and is employed by the server 130 and the remote driver to ascertain the position and movements of the vehicle 110.

The vehicle control section 112E controls driving of the vehicle drive device 114 based on the various information acquired by the remote operation information acquisition section 112B, the occupant-based operation information acquisition section 112C, and the autonomous travel information acquisition section 112D. For example, the vehicle control section 112E switches between remote operation, occupant-based operation, and autonomous travel based on the various acquired information.

The vehicle 110 also includes the external vehicle display section 112F. The external vehicle display section 112F is a vehicle display device provided to the outer shell of the vehicle 110 in order to display an image of the remote driver performing remote driving at the vehicle exterior under the control of the vehicle control section 112E. As an example, the external vehicle display section 112F is a display device such as a liquid crystal display or an organic electro-luminescence (EL) display.

The image-capture section 112I is an image-capture device such as a video camera that images the surroundings of the vehicle 110, including to the front, left, right, and rear of the vehicle 110. Image data of the surroundings of the vehicle 110 acquired by the image-capture section 112I is transmitted to a communication section 120A of the remote operation terminal 120 through the communication section 112A and the network 150. The image data transmitted to the communication section 120A of the remote operation terminal 120 is displayed on a display section 120D of the remote operation terminal 120, and serves as visual information employed during remote driving by the remote driver.

As illustrated in FIG. 1, the remote operation terminal 120 includes a processor such as a CPU, a storage device (memory), and functionally includes the communication section 120A, a remote operation terminal control section 120B, an image-capture section 120C that images of the remote driver, and the display section 120D that displays a video image of the surroundings of the vehicle 110. As an example, the remote operation terminal 120 includes interfaces that respectively correspond to a steering wheel, an accelerator pedal, a brake pedal, and a shift lever, and is capable of being operated in a similar manner to an actual vehicle. The display section 120D is a display device such as a liquid crystal display or an organic EL display that is capable of displaying the surroundings of the vehicle 110, including to the front, left, right, and rear of the vehicle 110. Alternatively, the display section 120D may be configured by VR goggles worn so as to cover both eyes of the remote driver in order to visually present a three-dimensional video image of the surroundings of the vehicle 110 to the remote driver.

The communication section 120A is a communication unit that is capable of communication through the network 150. The interface between the communication section 120A and the network 150 may be wired or wireless.

The remote operation terminal control section 120B controls the remote operation terminal 120. For example, the remote operation terminal control section 120B controls the communication section 120A such that the communication section 120A acquires operation information input by the remote driver and transmits this operation information to the server 130.

The image-capture section 120C is an image-capture device such as a video camera that images the remote driver performing remote driving. A video image of the remote driver imaged by the image-capture section 120C is transmitted to the communication section 112A of the vehicle 110 through the communication section 120A and the network 150. The video image of the remote driver transmitted to the communication section 112A of the vehicle 110 is displayed on the external vehicle display section 112F. The video image of the remote driver imaged by the image-capture section 120C may also be transmitted to a communication section 130B of the server 130 through the communication section 120A and the network 150. The server 130 may store the video image of the remote driver received by the communication section 130B as a record in a storage device (not illustrated in the drawings) such as a hard disk drive (HDD).

As illustrated in FIG. 1, functionality of the server 130 includes a server control section 130A and the communication section 130B. The communication section 130B is a communication unit that is capable of communication through the network 150. The interface between the communication section 130B and the network 150 may be wired or wireless.

The server control section 130A includes a processor such as a CPU, and a storage device (memory), and controls the server 130. For example, as described later, in a case in which a request for remote driving request is made at the user terminal 140, the server control section 130A controls the communication section 130B so as to transmit a remote driving request to the communication section 120A of the remote operation terminal 120. After request acceptance has been transmitted from the remote operation terminal 120, the server control section 130A controls the communication section 130B so as to transmit a formal request and confer remote driving authority on the communication section 120A of the remote operation terminal 120, and to transmit request acceptance to a communication section 140A of the user terminal 140.

In the exemplary embodiment, the remote operation terminal 120 on which remote driving authority has been conferred by the server 130 remotely operates the vehicle 110 through the network 150. Communication between the remote operation terminal 120 and the vehicle 110 may be performed through the server 130; however, there is a risk that a pronounced communication and control lag may arise if communication is performed through the server 130. Thus, in the exemplary embodiment, during remote driving of the vehicle 110 communication between the vehicle 110 and the remote operation terminal 120 is not performed through the server 130.

The user terminal 140 is a personal terminal such as a PC or a portable information terminal including a processor such as a CPU, a storage device (memory), and the communication section 140A that is capable of communication through the network 150. A user taking advantage of remote driving operates an operation section 140B such as a mouse, keyboard, or touch panel in order to make a remote driving request to the server 130. The request made by operating the operation section 140B is transmitted from the communication section 140A to the communication section 130B of the server 130 through the network 150.

Interactions such as request acceptance and request completion are transmitted from the communication section 130B of the server 130 to the communication section 140A of the user terminal 140 through the network 150.

Figure 2:
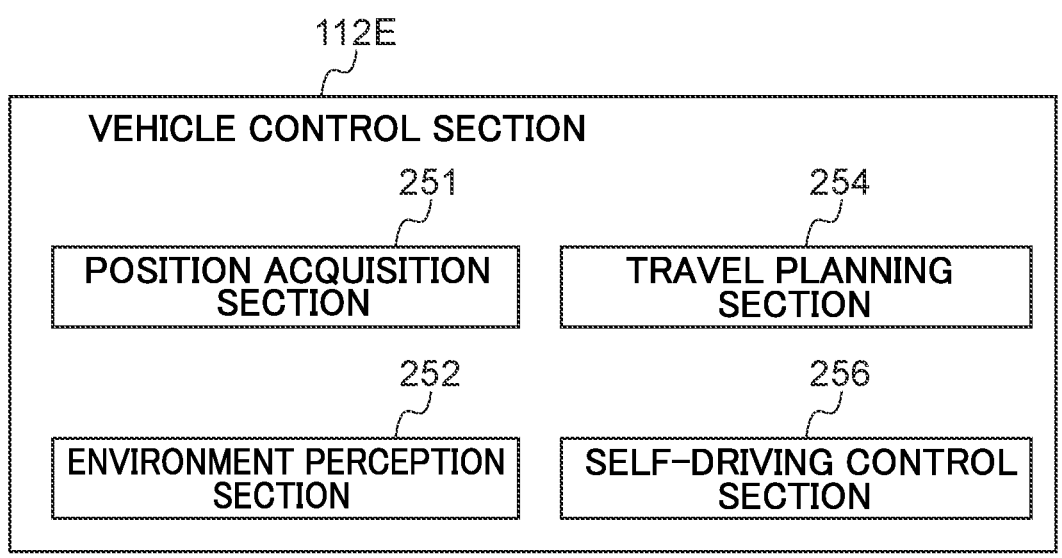
FIG. 2 is a block diagram illustrating an example of functional configuration of a vehicle control section.

FIG. 2 is a block diagram illustrating an example of functional configuration of the vehicle control section 112E. As illustrated in FIG. 2, the vehicle control section 112E includes a position acquisition section 251, an environment perception section 252, a travel planning section 254, and a self-driving control section 256. Each of these functional configurations is implemented by the vehicle control section 112E reading and executing an execution program stored in a storage device (not illustrated in the drawings) of the ECU 112.

The position acquisition section 251 includes functionality to acquire the current position of the vehicle 110. The position acquisition section 251 acquires position information using GPS technology or the like.

The environment perception section 252 includes functionality to perceive the travel environment in the surroundings of the vehicle 110. The environment perception section 252 acquires the travel environment of the vehicle 110 based on the sensor signals from the various sensors installed in the vehicle 110 as travel environment information. The "travel environment information" includes the weather, brightness, road lane width, obstacles, and the like in the surroundings of the vehicle 110.

The travel planning section 254 includes functionality to create a travel plan for the vehicle 110 from a departure point to a destination via one or more waypoints.

The self-driving control section 256 includes functionality to cause the vehicle 110 to travel according to the created travel plan, while also taking into consideration the position information and travel environment information.

Figure 3:
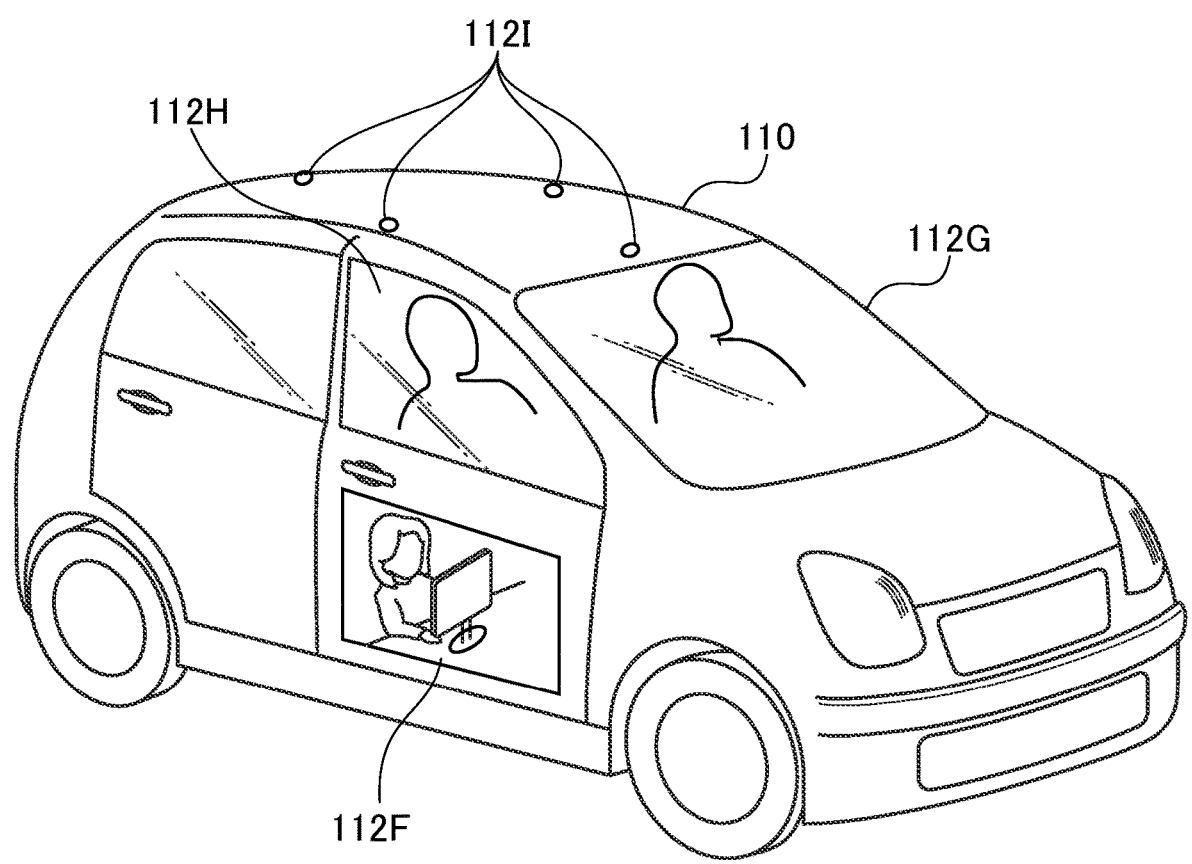
FIG. 3 is a schematic diagram illustrating an example of installation of an image-capture section and an external vehicle display section serving as a vehicle display device according to an exemplary embodiment of the present disclosure to an outer shell of a vehicle.

FIG. 3 is a schematic diagram illustrating an example of installation of the external vehicle display section 112F, this being a vehicle display device according to the exemplary embodiment, and the image-capture section 112I, on the outer shell of the vehicle 110. As an example, the external vehicle display section 112F is a display device such as a liquid crystal display or an organic EL display provided to a side face (such as a door panel) of the vehicle 110.

The image-capture section 112I is configured by image-capture devices such as video cameras respectively provided to front, left, right, and rear ends of the vehicle roof, and is capable of imaging the surroundings of the vehicle 110, including to the front, left, right, and rear of the vehicle 110. Alternatively, a video camera that is capable of simultaneous 360° imaging of the surroundings of the vehicle 110 may be provided on top of the roof of the vehicle 110.

The external vehicle display section 112F may be provided to either a windshield 112G or a side window 112H of the vehicle 110. In cases in which the external vehicle display section 112F is provided to the windshield 112G or the side window 112H of the vehicle 110 or similar, the view of the occupant in the vehicle 110 is impaired. Thus, a display device such as a liquid crystal display or an organic EL display may also be provided at the vehicle cabin inside of the windshield 112G or the side window 112H of the vehicle 110 so as to display a video image of the surroundings of the vehicle 110 acquired by the image-capture section 112I of the vehicle 110 in order to secure the view of the occupant.

Figure 4:
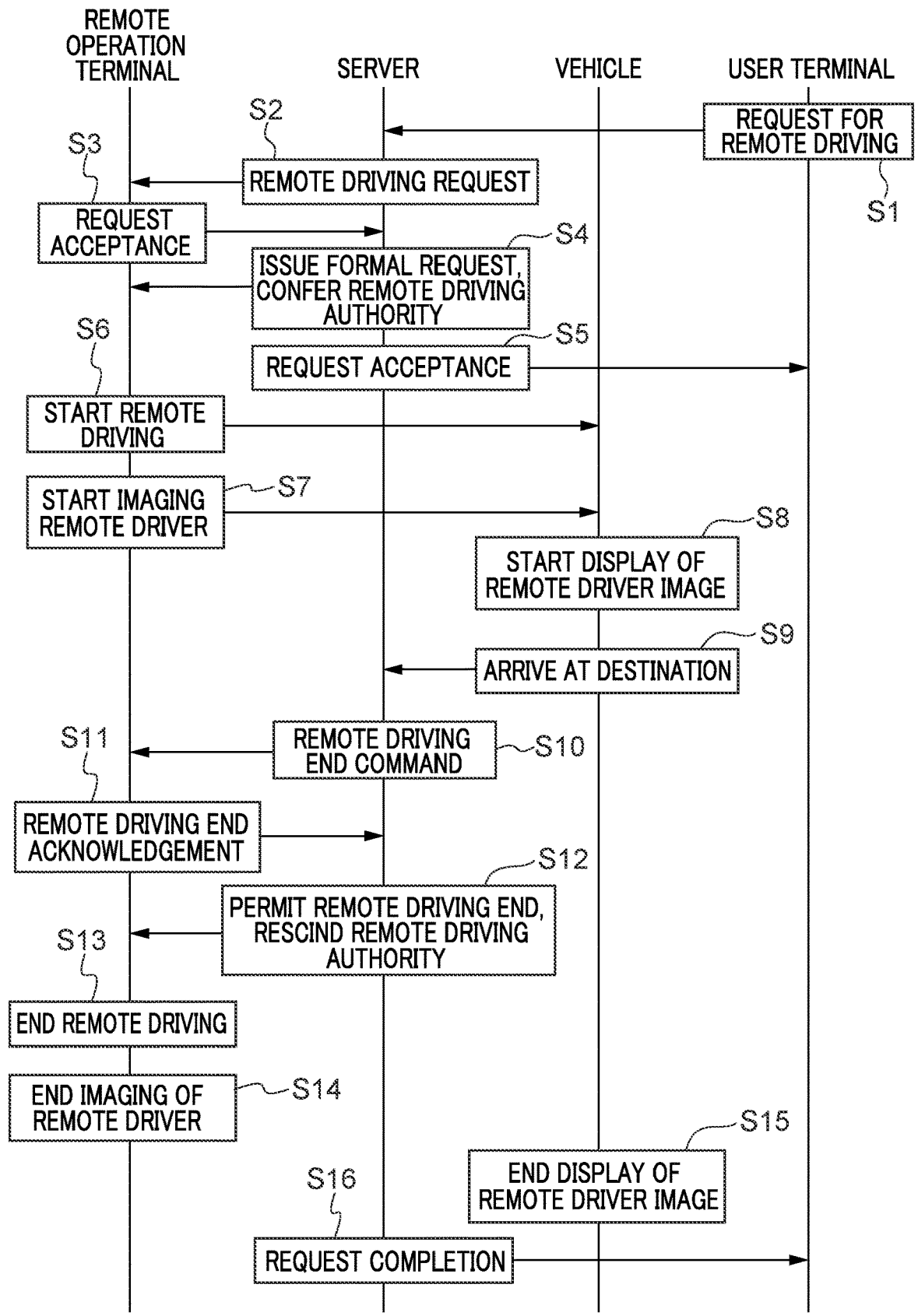
FIG. 4 is a sequence diagram illustrating an example of processing by a vehicle control system including a vehicle display device according to an exemplary embodiment of the present disclosure.

FIG. 4 is a sequence diagram illustrating an example of processing by the vehicle control system 100 including the vehicle display device according to the exemplary embodiment. At step S1, a request for remote driving is transmitted from the user terminal 140 to the server 130.

At step S2, a remote driving request is transmitted from the server 130 to the remote operation terminal 120. At step S3, request acceptance is transmitted from the remote operation terminal 120 to the server 130.

At step S4, a formal remote driving request is issued and remote driving authority to remotely operate the vehicle 110 is conferred on the remote operation terminal 120 by the server 130. After authority has been conferred at step S4, communication relating to the remote driving operation by the remote operation terminal 120 is enabled between the remote operation terminal 120 and the vehicle 110 through the network 150, without going through the server 130. At step S5, request acceptance is transmitted from the server 130 to the user terminal 140.

At step S6, remote driving starts, and the remote operation terminal 120 remotely operates the vehicle 110. At step S7, the image-capture section 120C of the remote operation terminal 120 starts to image a scene of the remote driver performing remote driving at substantially the same time as the processing of step S6 is performed.

At step S8, display of an image of the remote driver performing remote driving begins on the external vehicle display section 112F of the vehicle 110.

At step S9, the vehicle 110 notifies the server 130 that the vehicle 110 has arrived at its destination. At step S10, a remote driving end command is transmitted from the server 130 to the remote operation terminal 120.

At step S11, a remote driving end acknowledgement is transmitted from the remote operation terminal 120 to the server 130. At step S12, permission to end the remote driving is transmitted to the remote operation terminal 120 from the server 130, and the remote driving authority of the remote operation terminal 120 is rescinded. After the remote driving authority of the remote operation terminal 120 has been rescinded, the vehicle 110 travels to a predetermined location such as a garage by autonomous travel.

At step S13, remote driving by the remote operation terminal 120 is ended. At step S14, imaging of the remote driver is ended.

At step S15, display of the image of the remote driver on the external vehicle display section 112F of the vehicle 110 is ended. Then at step S16, request completion is transmitted from the server 130 to the user terminal 140.

As described above, in the exemplary embodiment, the actions of the remote driver performing remote driving are made available to third persons other than the occupant. This may encourage a sense of responsibility on the part of the remote driver, and contribute to safe driving during remote driving.

Note that the communication section 112A, the external vehicle display section 112F, the ECU 112, and the remote operation terminal 120 disclosed in detail in the present specification respectively correspond to a communication section, an external vehicle display section, a display control section, and a remote operation terminal of the present disclosure.

What is claimed is:

1. A vehicle control method comprising:
    receiving a remote operation instruction for a vehicle from a remote operation terminal;
    receiving an image of a remote operator who performs remote operation of the vehicle using the remote operation terminal; and
    displaying the image of the remote operator on an external vehicle display section.

2. The vehicle control method of claim 1, further comprising causing the vehicle to travel to a predetermined location by autonomous travel when the remote operation by the remote operation terminal is ended.

3. The vehicle control method of claim 1, further comprising terminating displaying of the image of the remote operator when the remote operation by the remote operation terminal is ended.

4. The vehicle control method of claim 1, further comprising acquiring the image of the remote operator by an image-capture section provided to the remote operation terminal.

5. The vehicle control method of claim 1, wherein the image of the remote operator comprises an image of the remote operator that is performing remote operation of the vehicle.

6. A non-transitory computer-readable storage medium storing a program that causes a computer to execute vehicle control processing, the vehicle control processing comprising:
    receiving a remote operation instruction for a vehicle from a remote operation terminal;
    receiving an image of a remote operator who performs remote operation of the vehicle using the remote operation terminal; and
    displaying the image of the remote operator on an external vehicle display section.

7. The non-transitory computer-readable storage medium storing the program that causes the computer to execute vehicle control processing of claim 6, wherein the image of the remote operator comprises an image of the remote operator that is performing remote operation of the vehicle.

8. A vehicle comprising:
    a communication section configured to receive a remote operation instruction for the vehicle from a remote operation terminal, and an image of a remote operator remotely operating the vehicle using the remote operation terminal;
    an external vehicle display section configured to display an image externally to the vehicle; and
    a display control section configured to cause the image of the remote operator received by the communication section to be displayed on the external vehicle display section.

9. The vehicle of claim 8, further comprising a vehicle control section that causes the vehicle to travel to a predetermined location by autonomous travel when the remote operation by the remote operation terminal is ended.

10. The vehicle of claim 8, wherein the display control section is configured to terminate displaying of the image of the remote operator when the remote operation by the remote operation terminal is ended.

11. The vehicle of claim 8, wherein the image of the remote operator is acquired by an image-capture section provided to the remote operation terminal configured to remotely operate the vehicle.

12. The vehicle of claim 8, wherein the external vehicle display section is installed on a surface of a door panel of the vehicle.

13. The vehicle of claim 8, wherein the external vehicle display section is installed on a windshield or a side window of the vehicle.

14. The vehicle of claim 8, wherein the image of the remote operator comprises an image of the remote operator that is performing remote operation of the vehicle.

15. A vehicle control system comprising:
the vehicle of claim 8;
a first terminal configured to be used by a user;
a second terminal that comprises an image-capture section and is configured to be used by the remote operator to remotely operate the vehicle; and
a server that is connected to the first terminal and the second terminal so as to be in communication with the first terminal and the second terminal.

16. The vehicle control system of claim 15, wherein the server is configured to:
receive a remote driving request for the vehicle from the first terminal,
transmit the remote driving request to the second terminal, confer driving authority on the second terminal, and enable communication between the second terminal and the vehicle, and
the second terminal is further configured to, after receiving the remote driving request and being conferred with driving authority from the server, image the remote operator using the image-capture section and transmit a captured image to the vehicle display device of the vehicle.

17. A vehicle control method comprising:
receiving a remote driving request for a vehicle from a first terminal used by a user;
transmitting the remote driving request to a second terminal configured to perform remote operation of the vehicle by a remote operator, conferring driving authority on the second terminal, and enabling communication between the second terminal and the vehicle;
transmitting a remote operation instruction to the vehicle from the second terminal;
imaging the remote operator using an image-capture section of the second terminal, and transmitting a captured image to the vehicle; and
causing a vehicle display device of the vehicle to display the received captured image on an external vehicle display section configured to display an image externally to the vehicle.

18. A non-transitory computer-readable storage medium storing a program that causes a computer to execute vehicle control processing, the vehicle control processing comprising:
receiving a remote driving request for a vehicle from a first terminal used by a user;
transmitting the remote driving request to a second terminal configured to perform remote operation of the vehicle by a remote operator, conferring driving authority on the second terminal, and enabling communication between the second terminal and the vehicle;
transmitting a remote operation instruction to the vehicle from the second terminal;
imaging the remote operator using an image-capture section of the second terminal, and transmitting a captured image to the vehicle; and
causing a vehicle display device of the vehicle to display the received captured image on an external vehicle display section configured to display an image externally to the vehicle.

* * * * *